(12) United States Patent
Wu et al.

(10) Patent No.: US 8,462,847 B2
(45) Date of Patent: Jun. 11, 2013

(54) METHOD AND APPARATUS FOR IMMEDIATE DISPLAY OF MULTICAST IPTV OVER A BANDWIDTH CONSTRAINED NETWORK

(75) Inventors: Fang Wu, Pleasanton, CA (US); Jack C. Cham, San Leandro, CA (US); Michael Pereira, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 218 days.

(21) Appl. No.: 13/016,773

(22) Filed: Jan. 28, 2011

(65) Prior Publication Data
US 2011/0131622 A1    Jun. 2, 2011

Related U.S. Application Data

(63) Continuation of application No. 11/364,152, filed on Feb. 27, 2006, now Pat. No. 7,965,771.

(51) Int. Cl.
*H04N 7/12* (2006.01)

(52) U.S. Cl.
USPC .................................................. 375/240.12

(58) Field of Classification Search
USPC ...................... 375/240.01, 240.12–240.16
See application file for complete search history.

(56) References Cited

U.S. PATENT DOCUMENTS

| 3,840,862 A | 10/1974 | Ready |
| 4,291,196 A | 9/1981 | Spaniol et al. |
| 4,426,682 A | 1/1984 | Riffe et al. |
| 4,802,085 A | 1/1989 | Levy et al. |
| 4,811,203 A | 3/1989 | Hamstra |
| 5,155,824 A | 10/1992 | Edenfield et al. |

(Continued)

FOREIGN PATENT DOCUMENTS

| CN | 1490976 | 4/2004 |
| CN | 1643857 A | 7/2005 |

(Continued)

OTHER PUBLICATIONS

Begen, Ali C., Enhancing the Multimedia Experience in Emerging Network, A Thesis Presented to the Academic Faculty; Dec. 2006; available at http://etd.gatech.edu/theses/available/etd-11062006-002415/; Dec. 2006.

(Continued)

*Primary Examiner* — Khanh C Tran
(74) *Attorney, Agent, or Firm* — Merchant & Gould (57) ABSTRACT

In a packet based multicast video streaming network, a method for minimizing delay in displaying video on a TV set in response to a viewer changing the channel is disclosed. For each live multicast video stream, one or more reference frames and corresponding compressed frames are temporarily stored in a memory in anticipation of the viewer switching to that particular program. When the viewer changes channels, the previously stored reference and compressed frames are immediately read from the memory and rendered for display on the TV. This eliminates the need to wait for the next available reference frame. In other words, this eliminates a temporary blank TV screen each time the channel is changed. Certain compressed frames are dropped and blank frames can be inserted in order to catch up to and synchronize with the live video broadcast. The particular frames to be dropped and the number of blank frames to be inserted is a function of the bandwidth limitation imposed by the last mile of the network.

21 Claims, 5 Drawing Sheets

U.S. PATENT DOCUMENTS

| | | | |
|---|---|---|---|
| 5,307,477 A | 4/1994 | Taylor et al. | |
| 5,444,718 A | 8/1995 | Ejzak et al. | |
| 5,483,587 A | 1/1996 | Hogan et al. | |
| 5,524,235 A | 6/1996 | Larson et al. | |
| 5,551,001 A | 8/1996 | Cohen et al. | |
| 5,600,366 A | 2/1997 | Schulman | |
| 5,600,663 A | 2/1997 | Ayanoglu et al. | |
| 5,636,354 A | 6/1997 | Lear | |
| 5,673,253 A | 9/1997 | Shaffer | |
| 5,729,687 A | 3/1998 | Rothrock et al. | |
| 5,734,861 A | 3/1998 | Cohn et al. | |
| 5,784,362 A | 7/1998 | Turina | |
| 5,828,844 A | 10/1998 | Civanlar | |
| 5,870,763 A | 2/1999 | Lomet | |
| 5,914,757 A * | 6/1999 | Dean et al. | 348/584 |
| 5,926,227 A | 7/1999 | Schoner et al. | |
| 5,933,195 A | 8/1999 | Florencio | |
| 5,933,593 A | 8/1999 | Arun et al. | |
| 5,963,217 A | 10/1999 | Grayson et al. | |
| 5,974,028 A | 10/1999 | Ramakrishnan | |
| 6,003,116 A | 12/1999 | Morita et al. | |
| 6,031,818 A | 2/2000 | Lo et al. | |
| 6,034,746 A | 3/2000 | Desai et al. | |
| 6,065,050 A | 5/2000 | DeMoney | |
| 6,119,205 A | 9/2000 | Wicki et al. | |
| 6,137,834 A | 10/2000 | Wine et al. | |
| 6,141,324 A | 10/2000 | Abbott et al. | |
| 6,151,636 A | 11/2000 | Schuster et al. | |
| 6,236,854 B1 | 5/2001 | Bradshaw | |
| 6,278,716 B1 | 8/2001 | Rubenstein | |
| 6,289,054 B1 | 9/2001 | Rhee | |
| 6,301,249 B1 | 10/2001 | Mansfield et al. | |
| 6,332,153 B1 | 12/2001 | Cohen | |
| 6,445,717 B1 | 9/2002 | Gibson et al. | |
| 6,501,739 B1 | 12/2002 | Cohen | |
| 6,516,435 B1 | 2/2003 | Tsunoda | |
| 6,532,562 B1 | 3/2003 | Chou et al. | |
| 6,567,929 B1 | 5/2003 | Bhagavath et al. | |
| 6,570,926 B1 | 5/2003 | Agrawal et al. | |
| 6,594,798 B1 | 7/2003 | Chou et al. | |
| 6,608,820 B1 | 8/2003 | Bradshaw | |
| 6,608,841 B1 | 8/2003 | Koodii | |
| 6,624,841 B1 | 9/2003 | Buchner et al. | |
| 6,643,496 B1 | 11/2003 | Shimoyama et al. | |
| 6,650,652 B1 | 11/2003 | Valencia | |
| 6,671,262 B1 | 12/2003 | Kung et al. | |
| 6,675,216 B1 | 1/2004 | Quatrano et al. | |
| 6,677,864 B2 | 1/2004 | Khayrallah | |
| 6,711,128 B1 | 3/2004 | Ramakrishnan | |
| 6,721,290 B1 | 4/2004 | Kondylis et al. | |
| 6,735,572 B2 | 5/2004 | Landesmann | |
| 6,744,785 B2 | 6/2004 | Robinett et al. | |
| 6,766,418 B1 | 7/2004 | Alexander | |
| 6,771,644 B1 | 8/2004 | Brassil et al. | |
| 6,775,247 B1 | 8/2004 | Shaffer et al. | |
| 6,782,490 B2 | 8/2004 | Maxemchuk et al. | |
| 6,792,047 B1 | 9/2004 | Bixby et al. | |
| 6,804,244 B1 | 10/2004 | Anandakumar et al. | |
| 6,816,469 B1 | 11/2004 | Kung et al. | |
| 6,823,470 B2 | 11/2004 | Smith et al. | |
| 6,839,325 B2 | 1/2005 | Schmidl et al. | |
| 6,865,157 B1 | 3/2005 | Scott et al. | |
| 6,865,540 B1 | 3/2005 | Faber et al. | |
| 6,876,734 B1 | 4/2005 | Summers et al. | |
| 6,909,718 B1 | 6/2005 | Aramaki et al. | |
| 6,910,148 B1 | 6/2005 | Ho et al. | |
| 6,925,068 B1 | 8/2005 | Stanwood et al. | |
| 6,931,001 B2 | 8/2005 | Deng | |
| 6,931,113 B2 | 8/2005 | Ortel | |
| 6,937,569 B1 | 8/2005 | Sarkar et al. | |
| 6,947,417 B2 | 9/2005 | Laursen et al. | |
| 6,956,828 B2 | 10/2005 | Simard et al. | |
| 6,959,075 B2 | 10/2005 | Cutaia et al. | |
| 6,976,055 B1 | 12/2005 | Shaffer et al. | |
| 6,989,856 B2 | 1/2006 | Firestone et al. | |
| 6,996,097 B1 | 2/2006 | Chou et al. | |
| 7,003,086 B1 | 2/2006 | Shaffer et al. | |
| 7,007,098 B1 | 2/2006 | Smyth et al. | |
| 7,024,609 B2 | 4/2006 | Wolfgang et al. | |
| 7,084,898 B1 | 8/2006 | Firestone et al. | |
| 7,114,002 B1 | 9/2006 | Okumura et al. | |
| 7,127,487 B1 | 10/2006 | Wang et al. | |
| 7,164,680 B2 | 1/2007 | Loguinov | |
| 7,180,896 B1 | 2/2007 | Okumura | |
| 7,224,702 B2 | 5/2007 | Lee | |
| 7,234,079 B2 | 6/2007 | Cheng et al. | |
| 7,257,664 B2 | 8/2007 | Zhang | |
| 7,263,075 B2 | 8/2007 | Roh et al. | |
| 7,296,205 B2 | 11/2007 | Curcio et al. | |
| 7,324,527 B1 | 1/2008 | Fraas et al. | |
| 7,333,439 B2 | 2/2008 | Itoh et al. | |
| 7,366,172 B2 | 4/2008 | Chou et al. | |
| 7,373,413 B1 | 5/2008 | Bich | |
| 7,376,880 B2 | 5/2008 | Ichiki et al. | |
| 7,379,653 B2 | 5/2008 | Yap et al. | |
| 7,392,424 B2 | 6/2008 | Ho et al. | |
| 7,397,759 B2 | 7/2008 | Tan et al. | |
| 7,532,621 B2 | 5/2009 | Birman et al. | |
| 7,562,277 B2 | 7/2009 | Park et al. | |
| 7,599,363 B2 | 10/2009 | Jang et al. | |
| 7,676,591 B2 * | 3/2010 | Chan et al. | 709/231 |
| 7,681,101 B2 | 3/2010 | Oran et al. | |
| 7,697,514 B2 | 4/2010 | Chou et al. | |
| 7,707,303 B2 | 4/2010 | Albers | |
| 7,711,938 B2 | 5/2010 | Wise | |
| 7,747,921 B2 | 6/2010 | DaCosta | |
| 7,801,146 B2 | 9/2010 | Aramaki et al. | |
| 7,870,590 B2 | 1/2011 | Jagadeesan et al. | |
| 7,877,660 B2 | 1/2011 | VerSteeg | |
| 7,886,073 B2 | 2/2011 | Gahm | |
| 7,889,654 B2 | 2/2011 | Ramakrishnan et al. | |
| 7,921,347 B2 | 4/2011 | Kim et al. | |
| 7,937,531 B2 | 5/2011 | Mitra | |
| 7,940,644 B2 | 5/2011 | Oran | |
| 7,940,777 B2 | 5/2011 | Asati | |
| 7,965,771 B2 | 6/2011 | Wu | |
| 8,031,701 B2 | 10/2011 | Oran | |
| 8,218,654 B2 | 7/2012 | Cheng et al. | |
| 8,245,264 B2 | 8/2012 | Toebes et al. | |
| 2001/0000540 A1 | 4/2001 | Cooper et al. | |
| 2002/0004841 A1 | 1/2002 | Sawatari | |
| 2002/0006137 A1 | 1/2002 | Rabenko et al. | |
| 2002/0010938 A1 | 1/2002 | Zhang et al. | |
| 2002/0087976 A1 | 7/2002 | Kaplan et al. | |
| 2002/0114332 A1 | 8/2002 | Apostolopoulos et al. | |
| 2002/0126711 A1 | 9/2002 | Robinett et al. | |
| 2002/0163918 A1 | 11/2002 | Cline | |
| 2003/0025786 A1 | 2/2003 | Norsworthy | |
| 2003/0025832 A1 | 2/2003 | Swart et al. | |
| 2003/0076850 A1 | 4/2003 | Jason, Jr. | |
| 2003/0101408 A1 | 5/2003 | Martinian et al. | |
| 2003/0158899 A1 | 8/2003 | Hughes | |
| 2003/0198195 A1 | 10/2003 | Li | |
| 2003/0231863 A1 | 12/2003 | Eerenberg et al. | |
| 2003/0236903 A1 | 12/2003 | Piotrowski | |
| 2004/0057449 A1 | 3/2004 | Black | |
| 2004/0071128 A1 | 4/2004 | Jang et al. | |
| 2004/0078624 A1 | 4/2004 | Maxemchuk et al. | |
| 2004/0100937 A1 | 5/2004 | Chen | |
| 2004/0114576 A1 | 6/2004 | Itoh et al. | |
| 2004/0143672 A1 | 7/2004 | Padmanabham et al. | |
| 2004/0165527 A1 | 8/2004 | Gu et al. | |
| 2004/0165710 A1 | 8/2004 | DelHoyo et al. | |
| 2004/0196849 A1 | 10/2004 | Aksu et al. | |
| 2004/0199659 A1 | 10/2004 | Ishikawa et al. | |
| 2004/0213152 A1 | 10/2004 | Matuoka et al. | |
| 2004/0244058 A1 | 12/2004 | Carlucci et al. | |
| 2004/0255328 A1 | 12/2004 | Baldwin et al. | |
| 2005/0058131 A1 | 3/2005 | Samuels et al. | |
| 2005/0069102 A1 | 3/2005 | Chang | |
| 2005/0074007 A1 | 4/2005 | Samuels et al. | |
| 2005/0078171 A1 | 4/2005 | Firestone et al. | |
| 2005/0078698 A1 | 4/2005 | Araya et al. | |
| 2005/0081244 A1 | 4/2005 | Barrett et al. | |
| 2005/0099499 A1 | 5/2005 | Braunstein | |
| 2005/0138372 A1 | 6/2005 | Kajihara et al. | |
| 2005/0169174 A1 | 8/2005 | Apostolopoulos et al. | |

| | | | |
|---|---|---|---|
| 2005/0198367 A1 | 9/2005 | Ettikan | |
| 2005/0204242 A1 | 9/2005 | Chou et al. | |
| 2005/0207406 A1 | 9/2005 | Reme | |
| 2005/0244137 A1 | 11/2005 | Takashima et al. | |
| 2005/0249231 A1 | 11/2005 | Khan | |
| 2005/0259803 A1 | 11/2005 | Khartabil | |
| 2005/0265346 A1 | 12/2005 | Ho et al. | |
| 2005/0289623 A1 | 12/2005 | Midani et al. | |
| 2006/0020995 A1 | 1/2006 | Opie et al. | |
| 2006/0048193 A1 | 3/2006 | Jacobs et al. | |
| 2006/0072596 A1* | 4/2006 | Spilo et al. | 370/412 |
| 2006/0075084 A1 | 4/2006 | Lyon | |
| 2006/0075443 A1 | 4/2006 | Eckert | |
| 2006/0083263 A1 | 4/2006 | Jagadeesan et al. | |
| 2006/0085551 A1 | 4/2006 | Xie et al. | |
| 2006/0104458 A1 | 5/2006 | Kenoyer et al. | |
| 2006/0120378 A1 | 6/2006 | Usuki et al. | |
| 2006/0126667 A1 | 6/2006 | Smith et al. | |
| 2006/0143669 A1 | 6/2006 | Cohen | |
| 2006/0159093 A1 | 7/2006 | Joo et al. | |
| 2006/0187914 A1 | 8/2006 | Gumaste et al. | |
| 2006/0188025 A1 | 8/2006 | Hannuksela | |
| 2006/0189337 A1 | 8/2006 | Farrill et al. | |
| 2006/0200842 A1 | 9/2006 | Chapman et al. | |
| 2006/0242240 A1 | 10/2006 | Parker et al. | |
| 2006/0242669 A1 | 10/2006 | Wogsberg | |
| 2006/0259755 A1 | 11/2006 | Kenoyer | |
| 2006/0279437 A1 | 12/2006 | Luby | |
| 2007/0008934 A1 | 1/2007 | Balasubramanian et al. | |
| 2007/0009235 A1 | 1/2007 | Walters et al. | |
| 2007/0044130 A1 | 2/2007 | Skoog | |
| 2007/0076703 A1 | 4/2007 | Yoneda et al. | |
| 2007/0098079 A1 | 5/2007 | Boyce et al. | |
| 2007/0110029 A1 | 5/2007 | Gilmore, II et al. | |
| 2007/0123284 A1 | 5/2007 | Schliwa-Bertling et al. | |
| 2007/0133435 A1 | 6/2007 | Eneroth et al. | |
| 2007/0200949 A1 | 8/2007 | Walker et al. | |
| 2007/0204320 A1 | 8/2007 | Wu et al. | |
| 2007/0214490 A1 | 9/2007 | Cheng et al. | |
| 2007/0268899 A1 | 11/2007 | Cankaya | |
| 2007/0277219 A1 | 11/2007 | Toebes et al. | |
| 2008/0062990 A1 | 3/2008 | Oran | |
| 2008/0189489 A1 | 8/2008 | Mitra | |
| 2008/0192839 A1 | 8/2008 | Gahm et al. | |
| 2008/0225850 A1 | 9/2008 | Oran | |
| 2008/0253369 A1 | 10/2008 | Oran et al. | |
| 2008/0256409 A1 | 10/2008 | Oran et al. | |
| 2008/0267078 A1 | 10/2008 | Farinacci | |
| 2008/0310435 A1 | 12/2008 | Cagenius et al. | |
| 2009/0034627 A1 | 2/2009 | Rodriguez et al. | |
| 2009/0034633 A1 | 2/2009 | Rodirguez | |
| 2009/0049361 A1 | 2/2009 | Koren et al. | |
| 2009/0055540 A1 | 2/2009 | Foti et al. | |
| 2009/0119722 A1 | 5/2009 | VerSteeg | |
| 2009/0150715 A1 | 6/2009 | Pickens | |
| 2009/0201803 A1 | 8/2009 | Filsfils | |
| 2009/0201805 A1 | 8/2009 | Begen et al. | |
| 2009/0213726 A1 | 8/2009 | Asati | |
| 2009/0217318 A1 | 8/2009 | VerSteeg et al. | |
| 2010/0005360 A1 | 1/2010 | Begen | |
| 2010/0036962 A1 | 2/2010 | Gahm | |
| 2011/0161765 A1 | 6/2011 | Oran | |
| 2012/0189007 A1 | 7/2012 | Oran et al. | |

FOREIGN PATENT DOCUMENTS

| | | |
|---|---|---|
| CN | 1947399 A | 4/2007 |
| EP | 1271953 | 1/2003 |
| EP | 1553735 | 7/2005 |
| EP | 1581005 | 9/2005 |
| EP | 1608116 | 12/2005 |
| EP | 1670252 | 6/2006 |
| EP | 2008/728919 | 2/2008 |
| EP | 7814245.2 | 5/2009 |
| EP | 2007/814246 | 6/2009 |
| EP | 8731381.3 | 11/2009 |
| EP | 2220845 | 8/2010 |
| WO | 97/18637 | 5/1997 |
| WO | 0019693 | 4/2000 |
| WO | 0035201 | 6/2000 |
| WO | 00/76113 | 12/2000 |
| WO | 01/61909 | 8/2001 |
| WO | 2005/048519 A1 | 5/2005 |
| WO | 2006031925 | 3/2006 |
| WO | 2006057606 | 6/2006 |
| WO | 2006107424 | 10/2006 |
| WO | 2008/000289 | 1/2008 |
| WO | 2008/033644 | 3/2008 |
| WO | 2008/033645 | 3/2008 |
| WO | 2008/100725 | 8/2008 |
| WO | 2008/112465 | 9/2008 |
| WO | 2009/058645 | 5/2009 |
| WO | 2009/099847 | 8/2009 |

OTHER PUBLICATIONS

Rosenberg, J., et al., "Registration of parityfec MME types," RFC 3009, Nov. 2000, 11 pgs.
Luby M., et al., "Forward Error Correction (FEC) Building Block", RFC 3452, Dec. 2002, 16 pgs.
Schulzrinne, H., "RTP: A Transport Protocol for Real-Time Applications," RFC 3550, Jul. 2003, 89 pgs.
Luby M., et al., "Compact Forward Error Correction (FEC) Schemes," RFC 3695, Feb. 2004, 14 pgs.
Ott, J., et al., "Extended RTP Profile for RTCP-based Feedback (RTP/AVPF)", draft-ietf-avt-rtcp-feedback-11, Aug. 10, 2004, 52 pgs.
Watson, M., "Basic Forward Error Correction (FEC) Schemes," draft-ietf-nmt-bb-fec-basic-schemes-revised-02, Mar. 3, 2006, 17 pgs.
Chesterfield, J., et al., "RTCP Extensions for Single-Source Multicast Sessions," draft-ietf-avt-rtcpssm-11, Mar. 6, 2006, 67 pgs.
Rey, J., et al., "RTP Retransmission Payload Format," RFC 4588, Jul. 2006, 24 pgs.
Pendleton et al., "Session Initiation Package for Voice Quality Reporting Event," Sipping Working Group, 2006, pp. 1-24.
Duffy, "Riverstone Recasts Multicast Video," 2 pgs., Aug. 5, 2002, Network World, Inc., www.networkworld.com/edge/news/2002/0805edge.html.
Lehman et al., Active Reliable Multicast (ARM), 1998, IEEE, pp. 581-589.
Liang et al., Feedback suppression in reliable multicast protocol, 2000, IEEE, pp. 1436-1439.
Adamson et al., Negative-Acknowledgment (NACK)-Oriented Reliable Multicast (NORM) Building Blocks (RFC 3941), Nov. 2004, RFC 3941 (IETF, ORG), pp. 1-37.
Nguyen, Thinh & Avideh, Protocols for Distributed Video Streaming, Image Processing, 2002, Proceedings, 2002 Int, Dec. 10, 2002, vol. 3, 185-188, ISBN: 0-7803-7622-6.
Degalahal et al., "Analyzing Soft Errors in Leakage Optimized SRAM Design," Article, Jan. 2003, pp. 1-7, 16th International Conference on VLSI Design.
Zhang, Computing Cache Vulnerability to Ransietn Errors and it's Implication, Article, Oct. 2005, pp. 1-9, IEEE Computer Society.
Weaver et al., Reducing the Soft-Error Rate of a High-Performance Microprocessor, Article, 2004, pp. 30-37, IEEE Computer Society.
Li et al., Soft Error and Energy Consumption Interactions: A Data Cache Perspective, Article, Aug. 9, 2004, pp. 1-6, ISLPED '04.
Rey et al., "RTP Retransmission Payload Form—RFC 4588", Jul. 1, 2006, 29 pgs.
Handley M. et al., "SIP: Session Initiation Protocol," RFC 2543, Mar. 1999.
T. Friedman, "RTP Control Protocol Extended Reports (RTCP XR)," RFC 3611, Nov. 2003.
Ott, "Extended RTP Profile for RTCP-based Feedback (RTP/AVPF)" draft ieft-av-rtcp-feedback-01-txt., Nov. 21, 2001.
Approach, Inc., "Streaming Media Technical Analysis," Nov. 2000.
Turner, Jonathan S., "WDM Burst Switching," www.isoc.org/inet99/proceedings/4j/4j_3.htm., 1999.
GossamerThreads, "Channel Change Speed," www.gossamer-threads.com/lists/engine?do=post_view_flat;post=13776, Sep. 12, 2003.
Nguyen, Thinh et al., Protocols for Distributed Video Streaming, IEEE ICIP 2002.

Byers, John W. et al., "Accessing Multiple Mirror Sites in Parallel: Using Tornado Codes to Speed Up Downloads," IEEE, 1999.
Cisco Systems, Cisco Visual Quality Experience: Product Overview, www.cisco.com/en/US/partners/prod/collateral/video/ps7191/ps7126/product_data_sheet0900aecd8057f446.htm, 2009.
Cisco Systems, Converge IP and DWDM Layers in the Core Network, http://www.cisco.com/en/US/prod/collateral/routers/ps5763/prod_white_paper0900aecd80395e03.html, 2007.
Silver Peak Systems, Inc., "Data Center Class WAN Optimization: Latency & Loss Mitigation," www.silver-peak.com/Technology/latency_loss_mitigation.htm., 2010.
P.A. Chou and Z. Miao, "Rate-distortion optimized streaming of packetized media," Microsoft Research Technical Report MSR-TR-2001-35, Feb. 2001.
Rajamoni, Ramakrishnan, R. Bhagavathula, & R. Pendse, "Timing analysis of block replacement algorithms on disk caches," 43rd IEEE Midwest Symposium on Circuits and Systems, Proceedings, Aug. 8-11, 2000.
Lee, Jung-Hoon, J.S. Lee, & S.D. Kim, "A selective temporal and aggressive spatial cache system based on time interval," 2000 International Conference on Computer Design (IEEE), Proceedings, Sep. 17-20, 2000.
International Search Report for PCT/US08/55837 mailed Jul. 3, 2008.
Written Opinion of the International Searching Authority for PCT/US08/55837 mailed Jul. 3, 2008.
U.S. PCT Office, International Search Report, Jul. 7, 2008, 3 pgs.
U.S. PCT Office, International Search Report, Jul. 7, 2008, 3 pgs.— Different.
Written Opinion of the International Searching Authority for PCT/US08/52907 mailed Jul. 7, 2008.
Written Opinion of the International Searching Authority for PCT/US07/76264 mailed Jul. 7, 2008.
International Search Report for PCT/US07/76265 mailed Aug. 20, 2008.
Written Opinion of the International Searching Authority for PCT/US07/76265 mailed Aug. 20, 2008.
International Search Report for PCT/US09/032305 mailed Oct. 5, 2009 (0599woul).
Written Opinion of the International Searching Authority for PCT/US09/032305 mailed Oct. 5, 2009 (0599woul).
Supplementary European Search Report for EP08731381, Mar. 26, 2010, 7 pgs.
Chinese Third Office Action dated Dec. 3, 2012 Appl. No. 200780022360.X, 8 pgs.
Brassil, Jack, et al., "Structuring Internet Media Streams with Cueing Protocols," IEEE/ACM Transactions on Networking, IEEE/ACM New York, NY, vol. 10, No. 4, Aug. 2002, XP011077174; Abstract Only.
Castro H., et al., "Monitoring Emerging IPv6 Wireless Access Networks," IEEE Wireless Communications, IEEE Service Center, Piscataway, NJ, vol. 12, No. 1, Feb. 2005, XP011127719.
International Search Report for PCT/US08/80882 dated Mar. 30, 2009, 3 pgs.
International Preliminary Report on Patentability (1 pg.) and Written Opinion of the International Search Authority (6 pgs.) for PCT/US08/80882 dated May 4, 2010.
U.S. Final Office Action dated Jan. 7, 2013, U.S. Appl. No. 11/674,093, 26 pgs.
Schulzrinne et al., RTP: A Transport Protocol for Real-Time Applications, Network Working Group, 2002, pp. 1-92.
Chinese First Office Action dated Aug. 3, 2010 in Appl. No. 200880004738.8, 16 pgs.
European Search Report for EP08728919, Aug. 19, 2010, 11 pgs.
Chinese Second Office Action dated May 20, 2011 in Appl. No. 200880004738.8, 11 pgs.
Chinese First Office Action dated Jul. 4, 2011 for Appl. No. 200780022360.X.
European Office Action dated Oct. 27, 2011 in Appl. No. 08 728 919.5 6 pgs.
Chinese Third Office Action dated Oct. 28, 2011 in Appl. No. 200880004738.8, 9 pgs.
Chinese Fourth Office Action dated Feb. 22, 2012 in Appl. No. 200880004738.8, 7 pgs.
Chinese Second Office Action dated Jul. 2, 2012 for Appl. No. 200780022360.X, 12 pgs.
U.S. Office Action dated Jul. 16, 2010 in U.S. Appl. No. 11/674,093, 30 pgs.
U.S. Final Office Action dated Dec. 21, 2010 in U.S. Appl. No. 11/674,093, 23 pgs.
U.S. Office Action dated Jul. 16, 2012 in U.S. Appl. No. 11/674,093, 38 pgs.
U.S. Office Action dated Oct. 27, 2009 in Appl. No. 12/101,796, 45 pgs.
U.S. Office Action dated Jul. 26, 2010 in U.S. Appl. No. 12/101,796, 41 pgs.
U.S. Final Office Action dated Feb. 17, 2011 in U.S. Appl. No. 12/101,796, 36 pgs.
U.S. Office Action dated Sep. 27, 2011 in U.S. Appl. No. 12/168,772, 17 pgs. (not M&G case).
U.S. Final Office Action dated Jan. 10, 2012 in U.S. Appl. No. 12/168,772, 15 pgs. (not M&G case).
U.S. Office Action dated Oct. 24, 2012 in U.S. Appl. No. 13/435,431, 25 pgs.
U.S. Office Action dated Oct. 31, 2012 in U.S. Appl. No. 13/043,437, 37 pgs.
European Search Report dated Mar. 7, 2013 cited in Appl. No. 07814246.0, 9 pgs.
Wonyong Yoon et al., "A Combined Group/Tree Approach for Scalable Many-to-many Reliable Multicast," Proceedings IEEE Infocom., vol. 3, Jun. 23, 2002, pp. 1336-1345.
Victor O.K. Li et al., "Internet Multicast Routing and Transport Control Protocols," Proceedings of IEEE, vol. 90, No. 3, Mar. 1, 2002, pp. 360-391.
Hrishikesh Gossain et al., "Multicast: Wired to Wireless," IEEE Communications Magazine, IEEE Service Center, vol. 40, No. 6, Jun. 1, 2002, pp. 116-123.
A. Erramilli et al., "A Performance Analysis of Protocols for Multicast Communication in Broadband Packet Networks," XP010077385, Jun. 13, 1988, pp. 222-226.
Chinese Fourth Office Action dated Mar. 25, 2013 cited in Appl. No. 200780022360.X, 7 pgs.

* cited by examiner

METHOD AND APPARATUS FOR IMMEDIATE DISPLAY OF MULTICAST IPTV OVER A BANDWIDTH CONSTRAINED NETWORK

This application is a continuation of U.S. patent application Ser. No. 11/364,152 filed Feb. 27, 2006, titled "METHOD AND APPARATUS FOR IMMEDIATE DISPLAY OF MULTICAST IPTV OVER A BANDWIDTH CONSTRAINED NETWORK", the disclosure of which is incorporated herein by reference in its entirety.

TECHNICAL FIELD

The present invention relates to a method and apparatus for the immediate display of multicast IPTV over a bandwidth constrained network.

BACKGROUND

Internet Protocol (IP) defines a standard by which data is transmitted over networks in the form of packets which are then routed to the intended recipients. In the past, IP data was limited to text, numbers, or simple pictures due to the constraints imposed by relatively slow and unsophisticated networks. However, as networks and routers become faster and more powerful, it has now gotten to the point where service providers are starting to offer real-time voice-over-IP (VoIP telephony) and digital television (IPTV) in addition to their standard IP-based web/Internet services. This "triple play" option of providing VoIP, IPTV, and IP Internet services over a single DSL, fiber optic, or cable line has proven to be quite popular with subscribers. Subscribers can make telephone calls, watch television, and surf the web without having to deal with a number of different companies. Presumably, the triple play option is cheaper for the consumer than if they had to subscribe to each of the services separately. And for service providers, triple play confers an opportunity to capture revenue from all three sources.

Aside from convenience and cost savings, triple play offers subscribers new features. For example, IPTV has several advantages over that of traditional TV. IPTV's point-to-point distribution scheme enables efficient stream control. Subscribers can pause, wind/re-wind, playback, skip, fast-forward, one-click recording, etc., all from the set-top box. In addition, IPTV inherently has the ability for two-way communication. This enables subscribers to select which movie they want to watch at any given time. Video on demand (VOD) is very popular with subscribers and is a growing source of revenue for service providers.

Unfortunately, video content contains a great amount of data. This is problematic because the "last mile" to/from a residence or office is typically bandwidth constrained. In other words, the last mile of twisted pair copper wires, fiber, cable, or wireless connection is physically limited to handling a maximum number of IP packets which may be transmitted over a given amount of time. IPTV can strain the capacity of the last mile, especially if other users are simultaneously surfing the web or making telephone calls or watching TV in another room.

One commonly used approach for minimizing the bandwidth requirements associated with transmitting video entails compressing the video through a video compression scheme, transmitting the smaller compressed video data, and then decompressing the video data before being displayed. A widely adopted video compression standard is set forth by the Moving Pictures Expert Group (MPEG). For instance, the MPEG-2 standard converts a video stream into I, P and B frames. The I frame is an intra-frame which contains all the data required to display the frame. An I frame is followed by a series of P and B frames. The P frame is a predictive frame which contains only the data that has changed from the preceding I frame. P frames rely on I frames to fill in most of its data. The B frame is a bidirectional frame which contains data that have changed from the preceding frame or are different from the data in the very next frame. By converting the frames of the original video stream into much smaller I, P, and B frames, the video stream comprised of I, P and B frames can be transmitted at a fraction of the bandwidth compared to non-compressed video streams. Once received, the I, P, and B frames are then used to reconstruct the original video stream for playback.

There is, however, one drawback to MPEG-2 and equivalent video compression schemes. When a subscriber switches channels, there can be a significant delay incurred in acquiring and displaying the selected new channel on the television screen. If the subscriber happens to switch channels right after an I frame was just transmitted for the new channel, the TV cannot display any video until the next I frame is received. Although a series of P and B frames are received, they are useless because a corresponding previous I frame is needed as a reference. Essentially, the viewer can occasionally experience a momentary blank or black screen right after switching channels. This can be quite disconcerting to viewers who are accustomed to traditional TV whereby switching channels instantaneously brings up the new channel for viewing.

DESCRIPTION OF THE DRAWINGS

The accompanying drawings, which are incorporated in and form a part of this specification, illustrate embodiments discussed below, and, together with the description, serve to explain the principles of the invention.

DETAILED DESCRIPTION

A method and apparatus for the immediate display of multicast IPTV over a bandwidth constrained network is described. Embodiments of the present invention significantly reduce the inherent non-deterministic delays associated with channel changing in today's packet based multicast networks where clients tune into different live broadcast channels by selectively joining multicast groups. A significant part of the delay associated with joining a new stream is the time it takes the client to receive program specific information and the initial I frame. In one embodiment, the previous I, P and B frames are temporarily stored in a cache memory. Each multicast broadcast stream has an associated cache memory upon which is stored the previous set of I, P, and B frames for that respective stream. When a viewer changes channels, the client issues a request to join the new multicast broadcast. The previous I frame corresponding to that particular stream is immediately read from the cache memory. This eliminates the need to wait for the next I frame. Because the I frame is readily available from the cache memory, the set-top box can generate a video image for immediate display on the television set. The P and B frames can also be fetched from the cache memory for generating the display of the video. Since the cached frames are burst at a rate higher than the broadcast stream being received, eventually, the live stream will synchronize with the stream being read out from the cache memory. In the case of limited network bandwidth, certain P and B frames can selectively be dropped in order to facilitate the synchronization process within a deterministic amount of time. A general discussion of IPTV and video compression is described below followed by a detailed description of the various embodiments of the present invention.

Today, most carriers are delivering MPEG2 compressed video to subscribers. In general, for MPEG2 and equivalent video compression schemes, the original video and audio are encoded via separate encoders into Elementary Streams (ES). These elementary streams are packetized into PES packets (Packetized Elementary Stream) that have variable packet sizes. These PES packets are then fragmented into 188 byte Transport stream (TS) packets and multiplexed together (VideoTS and AudioTS) before being encapsulated into an IP frame. Typically 7 TS packets would go into an IP frame (either UDP or RTP).

More specifically, MPEG2 encodes video into I, P and B frames or elementary streams. I frames are intra-coded only. An I frame serves as a reference frame for future predictions. Moderate compression (on order of 10:1), limits the propagation of transmission of errors, supports random access and fast forward/fast reverse. P frames are forward prediction from either previous I frames or previous P frames. P frames serve as reference for future P or B frames. P frames give good compression savings (20:1). B Frames are bi-directional interpolated prediction from two sources. B frames serve as previous reference I or P frames (forward prediction) or as future reference I or P frames (backwards prediction). B frames confer the highest compression (50:1).

I Frames=Intra-coded only—reference frame for future predictions.
P Frames=Forward prediction from either previous I frames or previous P frames. Reference for future P or B frames.
B Frames=Bi-directional interpolated prediction from two sources.
Previous reference I or P frames (forward prediction). Future reference I or P frames (backwards prediction).

Figure 1:
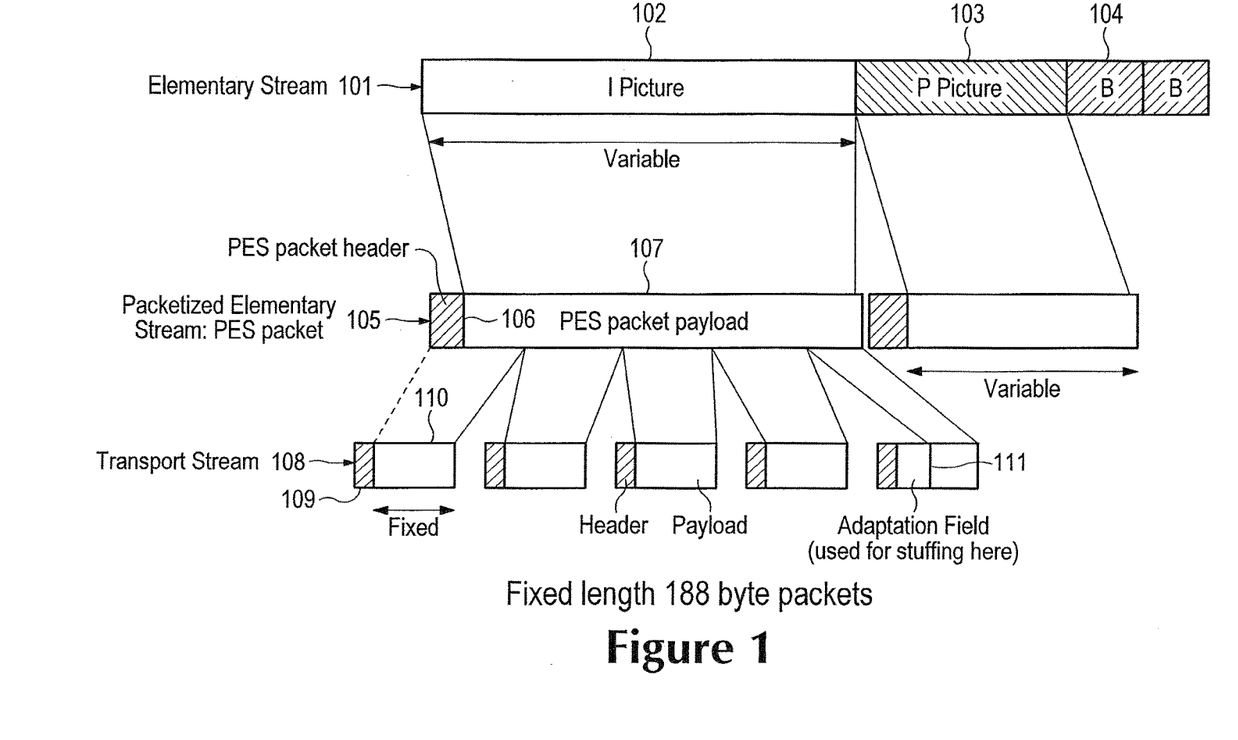
FIG. 1 shows the encoding of frames into PES and TS packets.

Referring to FIG. 1, the encoding of frames into PES and TS packets is shown. The Elementary Stream 101 is depicted as I Picture 102, followed by P Picture 103, which is followed by B Picture 104. The Elementary Stream 101 is encoded into a Packetized Elementary Stream (PES packet) 105. The PES packet 105 is comprised of a PES packet Header 106 and a PES packet payload 107. The PES packet 105 is encoded into a Transport Stream 108. The Transport Stream 108 is comprised of packets having a header portion (e.g., header 109) and a fixed payload portion (e.g., payload 110). The last packet shown also includes an Adaptation Field 111 which could occur in any TS packet This format offers great flexibility as to how the delivery of video can be structured. First, the frame rate can be variable; it can start from as low as 10 frames-per-second (fps). The typical frame rate for NTSC is 30 fps, and the typical rate for PAL is 24 fps The number of I frames sent is also variable and since I frames contain the most amount of data, they also incur the heaviest bandwidth requirements. For video with a lot of motion, more I frames should be sent to get the best effect. Also, the higher number of I frames sent, the faster the decoder can start displaying the picture (i.e., faster channel change time from a user perspective), since the decoder needs an I frame to initially sync to; again this has to be weighed against increase in bandwidth to send more I frames.

Figure 2:
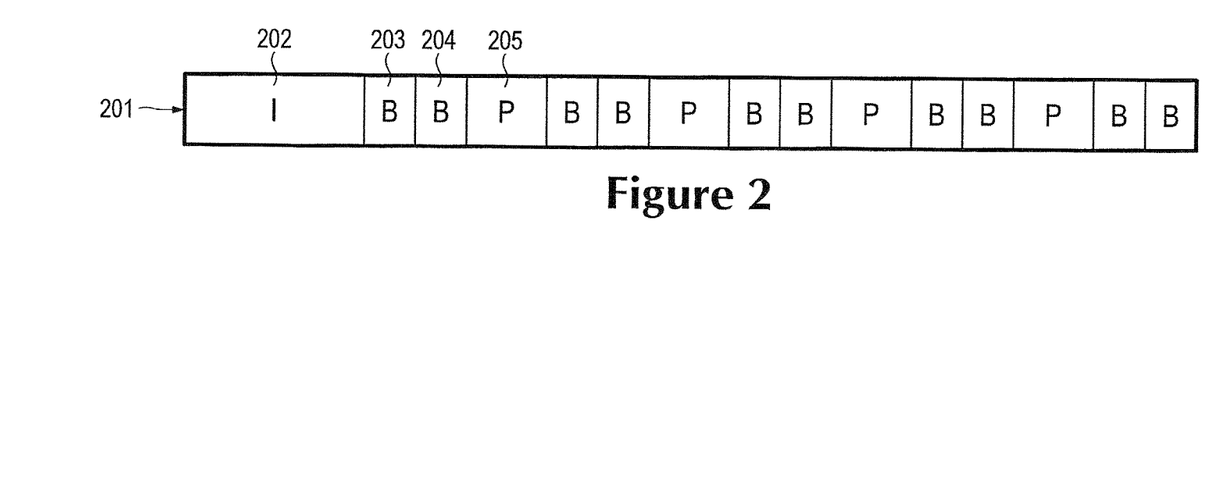
FIG. 2 shows a typical 15 frame Group of Pictures (GOP) that contains I, P and B frames.

A GOP or Group of pictures is defined as the number of I, P, B frames that are sent prior to the next I frame. A typical Group of Pictures (GOP) that contains I, P and B frames sent is shown in FIG. 2. In this particular GOP 201, an I Frame 202 is followed by two B frames 203-204 and a P frame 205. Successive B, B, P, B, B, P, B, B, P, B, and B frames follow. This is commonly referred to as a broadcast channel with a GOP size of 15 (i.e., 15 frames in the GOP). Note that to keep to the frame rate of 30 fps for NTSC, this sequence would have to be repeated twice per second. In a typical GOP sent out, there are 1×I frame, 4×P frames and 10×B frames. The frame size given the amount of information carried in each is I>>P>>B Typical bandwidth allocation per frame is I=9, P=2, and B=1. This results in approximately an equal amount of time for transmission of each type of frame:
I frame=1×9=9
P frame=4×2=8
B frame=10×1=10
So in a 30 fps video stream, each frame is allocated 1000/30=33 ms/frame. The bandwidth allocation per type of frame is approx ⅓ the bandwidth which for a 15 GOP results in:
Each I Frame=⅙ bandwidth
Each P frame=1/24 bandwidth
Each B frame=1/60 bandwidth
This can be translated into bandwidth requirements per type of frame in a MPEG2 stream.

When the user decides to change channels (i.e., join a different multicast group), he or she has no idea which frame is currently being sourced by the edge device (i.e., I, P or B). The set top box, which includes the decoder, on the other hand, needs an I frame to start to display video from the new channel. It can be seen that with a GOP size of 15 in an NTSC environment, there could be at a minimum 0.5 second variance between best and worst case channel changes and this does not take into account other associated delays.

In one embodiment, the delay is substantially reduced by implementing a Video/Audio Acceleration Mechanism (VAM) that allows clients connected to packet based multicast networks to have fast and deterministic startup delays. Ideally, the VAM should reside at the edge concentrator of the network (e.g., Digital Subscriber Line Access Multiplexer "DSLAM" that support xDSL network, Optical Line Termination "OLT" that support Passive Optical Network or Edge Quadruple Amplitude Modulation card "QAM" that support cable network). However, this VAM function can also reside in the aggregation edge device that sits upstream from the access concentrator. In addition to supporting faster startup delays, the VAM will adaptively adjust the video/audio stream to maintain that the maximum bandwidth that can supported by the last mile access is not violated. This will be described in detail below.

Inherently, client devices have delays associated with various startup mechanisms built in them that vary from set top box vendor to vendor. Delays include local processor reset delays, Phased Lock Loop (PLL) delays etc. Embodiments of the invention addresses the PLL delay and mitigation, but the focus will be on removal of client buffering delay by burst transmission of frames within the bandwidth limitations imposed by the client last-mile loop.

Figure 3:
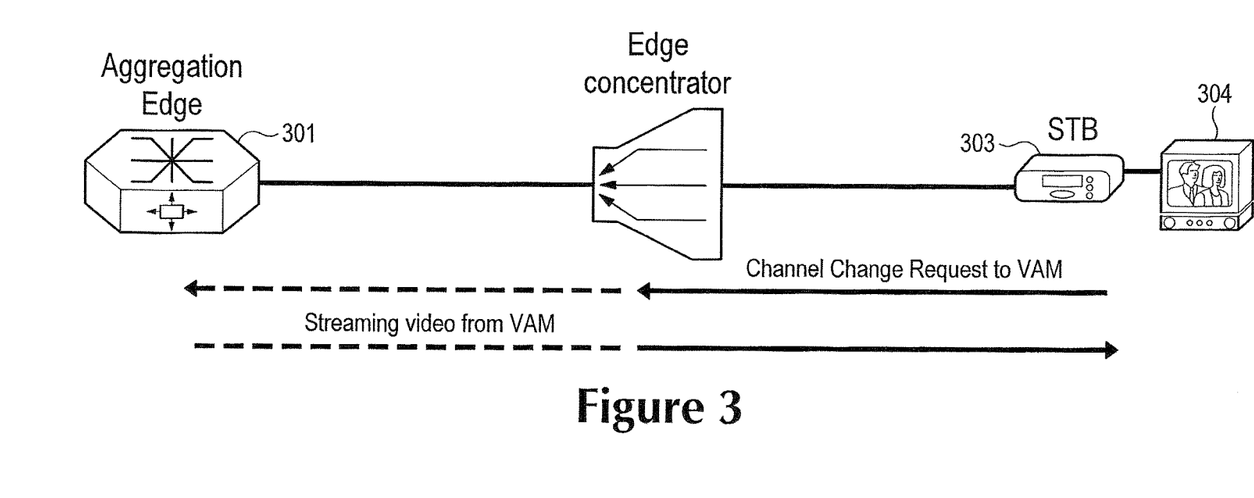
FIG. 3 shows a simplified network topology.

FIG. 3 shows a simplified network topology. The bandwidth constrained last mile exists between the Edge Node 301 and the set top box (STB) 303. Customer requests for channel changes generated by a remote device, propagate thru the STB 303 and to the Video Acceleration Mechanism inside the Edge Node 301. In response to the channel change, the streaming video corresponding to the new channel is transmitted from the VAM, through the last mile to the STB 303 for display on television 304.

Figure 4:
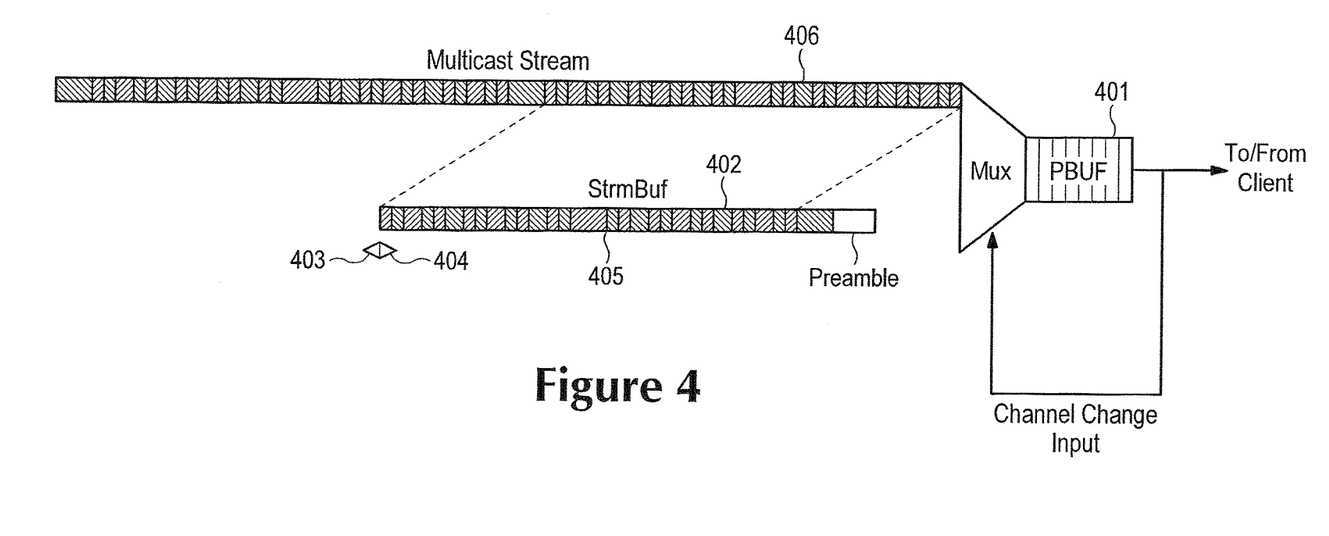
FIG. 4 shows one embodiment for the buffering within a VAM.

FIG. 4 shows one embodiment for the buffering within the VAM. The VAM has separate outgoing client buffers for each client port (PBUF) 401. In addition, the VAM will also have fixed buffers for each multicast stream it is sourcing to clients, referred to herein as Streaming Buffers (StrmBuf). StrmBuf 402 is comprised of a circular buffer with a sliding window of buffers that buffer a fixed number of GOP's aligning the start of the buffer to the start of a GOP as shown in the figure. In addition, a Sync Point (SPT) 403 is defined as part of StrmBuf 402 to indicate a synchronization point between the Video Acceleration component and the regular multicast stream 406. The Sync Point 403 is where StrmBuf 402 merges back to the regular multicast stream 406. After the merge, StrmBuf 402 becomes free and dynamically adjusts to the multicast stream as explained before. Note that the SPT 403 does not necessarily have to be done at an I frame boundary. Also note that while the channel change window (between points 404 and 405) is shown starting at the end of the first GOP with StrmBuf 402 SPT threshold being set for 1 GOP, there will be other more ideal thresholds that will allow the channel change window to move around. Receiving the Channel Change at 405 i.e. just prior to the Next I frame illustrates the case that requires the highest burst bandwidth since the entire prior GOP (15 frames) has to be sent but allows the greatest flexibility in terms of time for the VAM to manage hitting SPT (403). Receiving the Channel Change between 404 and 405 minimizes the burst bandwidth but decreases the flexibility in terms of time for the VAM to manage hitting SPT. To illustrate the Video Acceleration Mechanism functionality the above threshold 405 was chosen.

Figure 5:
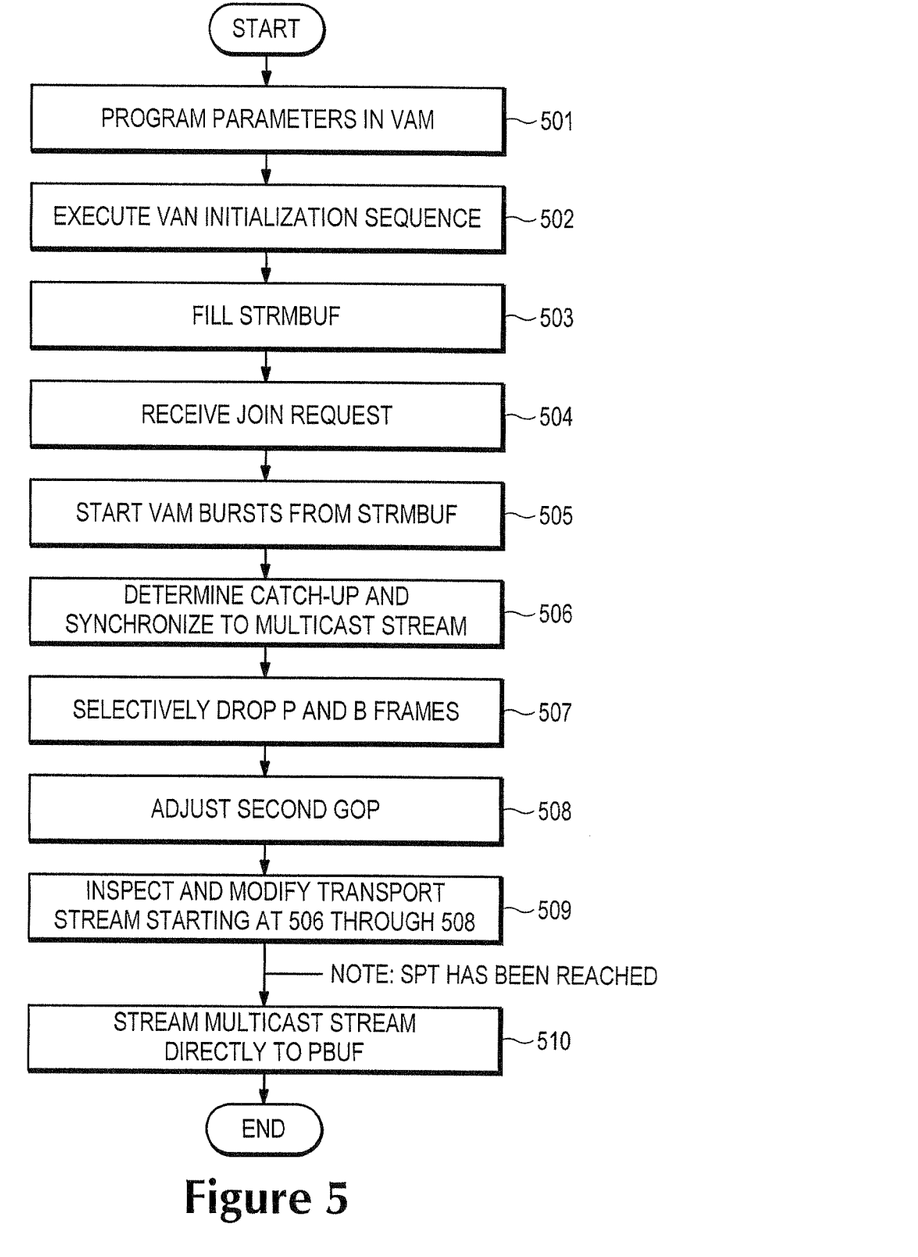
FIG. 5 shows the process flow for one embodiment of the Video Acceleration Module.

FIG. 5 shows the process flow for one embodiment of the Video Acceleration Module. Initially, in process block 501, initialization parameters (e.g., client last-mile bandwidth availability, preamble requirements, etc.) are pre-programmed into the VAM. In process block 502, the VAM builds preamble from incoming multicast stream. Functions that will allow for faster channel change time are configured as part of the initialization sequence and will be captured into preamble space. Bits sent out in PID 0 that detail Program Specific Information (PSI), such as the Program Association Table (PAT) and Program Mapping Table (PMT) as well as a Program Clock Reference that allows the decoder PLL contained in the client device to synch its internal clock to the incoming stream. A typical PCR transmission rate is every 33 ms. In process block 503, the StrmBuf fill begins from a live multicast stream starting with an I frame and a sliding window that includes the preamble as shown in FIG. 4 above. One GOP is always buffered along with the preamble, since the threshold to illustrate the mechanism was chosen to be 1 GOP. The Join Request issued from the client is received by process block 504 at the port by the VAM in the channel change window indicated between points 404 and 405 in FIG. 4 above. In process block 505, the VAM starts bursting from StrmBuf beginning with the preamble and first I frame into the port buffer PBUF. Since StrmBuf has pre-buffering from the incoming multicast stream, for the first GOP, it could be in various stages of being filled anywhere from point 404 to point 405. Point 405 represents the worst case scenario whereby the last B frame has just been received and the VAM has started buffering the start of the I frame into StrmBuf.

In process block 506, the VAM catches up and synchronizes to the multicast stream within the bandwidth constraints imposed by the last mile. The VAM does this by selectively dropping P and B frames as needed to allow for catching up and by selectively adding Blank frames to make sure that the bandwidth for that frame rate does not exceed the maximum specified. As an example, assume that a 4 Mbps MPEG2 stream can be allowed to burst at 33% higher rate during the catch-up window. Looking at the traditional (30 fps) GOP is: I B B P B B P B B P B B P B B. If one drops every B frame, the result is: I P P P P I P P P P I P P P P. With the bandwidth allocation for each frame given in the overview section, one ends up with a total bandwidth for the case were all B frames were dropped $$= [3(\# \ I \ \text{frames}) * 1/6bw + 12(\# \ P \ \text{frames}) * 1/24bw]$$

$$= 1bw \times 2GOP/\text{sec}$$

$$= 2bw$$

which in essence represents that the bandwidth has doubled to send the 15 frame GOP without B frames in 500 ms (30 fps). Now if one selectively adds Blank frames indicated by Bl, one ends up with the following: I P Bl P Bl P Bl P I P Bl P Bl P P. The calculation is now=2*⅙ bw+8*1/24 bw=⅔ bwx2GOP/sec which is exactly 30% over the burst period required (i.e., one can safely burst this GOP at 30 fps and meet, and yet not exceed, the stipulated 33% higher bandwidth requirement). The effect of the VAM bursting GOP(s) like this on the viewer is a perception of the channel being fast forwarded for the period the GOP is being sent.

Proceeding to process block 507, the VAM now drops all B frames from the first GOP that it has already pre-buffered and possibly even P frames depending on how much higher bandwidth is allocated for catching-up. This is done based on last-mile bandwidth constraints. Blank frames can and will be added to make sure the burst stream meets bandwidth limits. The higher the bandwidth available to burst, the less frames that need to be dropped and the faster one can reach SPT (i.e., the join point back to the broadcast stream). Next, the VAM, in process block 508, adjusts through the second GOP still being received by selectively dropping B and P frames and inserting Blank frames (for bandwidth reasons) so that it can reach the SPT prior to the next I frame. Taking the example given above, and a worst case channel change at point 405, by the time the burst streaming from StrmBuf reaches Point 405, (1*165 ms) for 1 frame+(4*41 ms) for P frames+(5×0 ms) for Bl frames=329 ms will have elapsed and 329 ms worth of incoming multicast data will now be contained in the second GOP of StrmBuf. This is equivalent to: I B B P B B P B. The Burst algorithm in VAM can now again selectively drop the B and/or P frames and insert Blank frames as needed to reach the SPT in an iterative process. In the best case where the channel change is received at point 404, the last B frame, all frames except the I's, can be dropped to help catch up the fastest. As a result:

OriginalStrmBuf=I B B P B B P B B P B B P B B I B B P B B P B B P B B P B B

Burst Stream=I I B

Again, Blank frames will have to be inserted between the I frames to meet maximum bandwidth requirements.

Since the VAM will be adjusting the Transport Stream on the fly, it will have to inspect into the packet and modify the video timestamps and PCR timing contained within the Transport Stream. This is shown by process block 509. Once the SPT has been hit, the mux select changes so that the multicast stream can now be streamed directly to PBUF, as shown by process block 510.

In other embodiments, whereas the choices for which frames to drop may seem quite endless, if one plans on keeping the user experience viewable with an impression of fast forward during the catch-up period, the choices of which frames to drop narrows quickly. For example from the above description of I, P, B frames, it has been realized that not all the P frames in a GOP can be dropped because then the B frames have no reference. Consequently, groups of P and B frames have to be selectively dropped as illustrated below:

Time→

Embodiment 1: I B B P B B P B B P B B P B B I (original frame)
BW=1 bw
Embodiment 2: I B B P B B P B B P I B B P B
BW=1.3 bw
Embodiment 3: I B B P B B P I B B P B B P I
BW=1.6 bw
Embodiment 4: IBBPI BBP IBBP IBB
BW=1.85 bw Embodiment 2 has dropped the last P frame along with the following B frames, since the B frames will have no reference with the P frame removed. Embodiment 3 has dropped the last two P frames along with the associated B frames. Embodiment 4 has dropped the last three P frames with associated B frames. Other embodiments can include selectively dropping any number of B frames in the four embodiments given above. Moreover, Blank frames can be added to the resulting streams to further decrease the BW to meet acceptable maximum thresholds.

As an example for embodiment 4, if the max BW defined is 1.3 bw i.e. 30% over the existing stream bandwidth, one needs to insert Blank frames to get from 1.85 bw to 1.3 bw and hence one needs to modify the GOP to:

I B B B Bl P Bl I B Bl B Bl P Bl I BW=1.3 bw

Note also that embodiment 2 results in the same bandwidth as the example previously given where all the B frames were dropped and Blank frames (Bl) inserted. A static lookup table can be built at initialization time for the Video Acceleration module to access in real time. The table allows the VAM to manage bandwidth requirements against which frames to drop and where to insert Blank frames.

It should be noted that although the subject matter above relating to a method and apparatus for the immediate display of broadcast video delivered over a bandwidth constrained IP network has been disclosed in a language specific to structural features and/or methodological acts, it is to be understood that the subject matter defined in the appended claims is not necessarily limited to the specific features or acts described above. Rather, the specific features and acts described above are disclosed as example forms of implementing the claims.

The features and methodological acts described above can also be applied to other advanced video compression technologies (e.g., advanced video coding—AVC (MPEG4-Part 10), Windows Media (VC1 etc), and all video compression technologies utilizing reference and predictive frames.

The invention claimed is:

1. One or more non-transitory computer readable storage media encoded with software comprising computer executable instructions and when the software is executed operable to:
store initialization parameters including one or more preamble settings;
receive and store a multicast stream in a buffer prior to a channel change request, the stored multicast stream comprising an I frame, a sliding window, the sliding window including a preamble conforming to the initialization parameters;
receive a client join request during the channel change;
transmit the stored multicast stream responsive to the request; and
synchronize transmission of the stored multicast to a corresponding live multicast stream according to the initialization parameters.

2. The non-transitory computer readable storage media of claim 1, wherein the transmission of the stored multicast stream begins with the preamble and first I frame.

3. The non-transitory computer readable storage media of claim 1, wherein one Group of Pictures (GOP) is buffered along with the preamble.

4. The non-transitory computer readable storage media of claim 1, further comprising software comprising computer executable instructions and when the software is executed operable to: select the buffer from a plurality of Streaming Buffers, each Streaming Buffer corresponding to a particular multicast stream sourcing to a client device.

5. The non-transitory computer readable storage media of claim 1, wherein the stored multicast stream is transmitted within a bandwidth according to the initialization parameters.

6. The non-transitory computer readable storage media of claim 1 with software comprising computer executable instructions, wherein the software when executed is further operable to: selectively drop P or B frames, or combinations thereof from the stored multicast stream.

7. The non-transitory computer readable storage media of claim 1 with software comprising computer executable instructions, wherein the software when executed is further operable to: selectively add Blank frames to prevent a bandwidth for a particular frame rate from exceeding a maximum specified in the initialization parameters.

8. A method comprising:
storing initialization parameters including one or more preamble settings or bandwidth constraints, or combinations thereof;
storing a multicast stream, the multicast stream comprising an I frame and a sliding window, wherein the sliding window includes a preamble conforming to the initialization parameters;
receiving a client join request;
streaming the stored multicast stream responsive to the request; and
synchronizing the streaming multicast to a live multicast stream according to the initialization parameters.

9. The method of claim 8, wherein one Group of Pictures (GOP) is buffered along with the preamble.

10. The method of claim 9, further comprising dropping all B frames from the buffered GOP and P frames according to a difference in bandwidth allocated for synchronizing the streaming multicast as identified by the bandwidth constraints defined in the initialization parameters.

11. The method of claim 9, further comprising dropping B frames or P frames, or combinations thereof from the buffered GOP according to the bandwidth constraints identified in the initialization parameters.

12. The method of claim 9, further comprising adjusting a next GOP by selectively dropping B and P frames and inserting Blank frames to reach a stream join point in the live multicast stream prior to a next I frame.

13. The method of claim 8, further comprising inspecting live media stream packets and modifying one or more timestamps.

14. The method of claim 8, further comprising determining a synchronization point in the live multicast stream.

15. The method of claim 14, further comprising merging the stored multicast stream with live multicast stream at the synchronization point.

16. The method of claim 8, further comprising replacing a first display of the stored multicast stream with a second display of the live multicast stream.

17. The method of claim 8, further comprising selecting an MUX operation to direct an incoming live multicast stream directly to a port buffer.

18. The method of claim 8, further comprising aligning a start of the buffering to a start of a GOP.

19. An apparatus comprising:
   a memory for storing an incoming video stream corresponding to a channel; and
   a processor coupled to the memory configured for:
      determining a request to join a new video stream indicates execution of a channel change operation to the channel;
      associating a reference frame to corresponding compressed frames of the stored video stream in the memory;
      synchronizing the stored video stream with the new video stream at a synchronization point in the new video stream according to an available bandwidth;
      wherein the processor drops some compressed frames and inserts blank frames in order to catch up to the synchronization point in the new video stream within the available bandwidth.

20. The apparatus of claim 19, wherein the memory and the processor comprise a video/audio acceleration mechanism.

21. The apparatus of claim 19, wherein the stored video stream is immediately burst from the memory prior to synchronization for transmission to render a video display corresponding to the channel.

* * * * *